United States Patent [19]

Burggraf et al.

[11] Patent Number: 5,155,371

[45] Date of Patent: Oct. 13, 1992

[54] APPARATUS FOR DETECTING DEFORMATIONS IN PRESSED MEMBERS

[75] Inventors: Hubert Burggraf, Oyten; Dirk Rathjen, Bremen; René Krupka, Schwäbisch Gmünd, all of Fed. Rep. of Germany

[73] Assignee: Krupp Atlas Elektronik GmbH, Bremen, Fed. Rep. of Germany

[21] Appl. No.: 628,141

[22] Filed: Dec. 17, 1990

[30] Foreign Application Priority Data

Dec. 18, 1989 [DE] Fed. Rep. of Germany ....... 3941725

[51] Int. Cl.$^5$ .............................................. G01N 21/88
[52] U.S. Cl. ...................... 250/563; 356/431
[58] Field of Search ................ 250/562, 563, 572; 356/430, 431, 237

[56] References Cited

U.S. PATENT DOCUMENTS

| 4,092,068 | 5/1978 | Lucas et al. | 250/563 |
| 4,376,583 | 3/1983 | Alford et al. | 250/563 |
| 4,849,645 | 7/1989 | Mendenko et al. | 250/563 |

FOREIGN PATENT DOCUMENTS

| 1731823 | 1/1979 | Fed. Rep. of Germany . |
| 523504 | 7/1972 | Switzerland . |

Primary Examiner—David C. Nelms
Assistant Examiner—K. Shami
Attorney, Agent, or Firm—Spencer, Frank & Schneider

[57] ABSTRACT

A device for detecting deformations in the surface of a workpiece includes a light source for illuminating the surface of the workpiece; a detector situated at a fixed predetermined distance from the light source and a displacing arrangement for effecting a relative movement between the workpiece and the light source. The detector comprises a photoreceiver for receiving reflected light from the workpiece and for generating a first output signal having a frequency dependent from the deformation of the workpiece. The photoreceiver is position-sensitive perpendicularly to a direction of the relative movement. A frequency analyzer is operatively connected to the receiver for receiving the first output signal from the photoreceiver and for generating a second output signal when the frequency of the first output signal exceeds a cutoff frequency. There is further provided a deformation indicator operatively connected to the frequency analyzer for receiving the second output signal therefrom and for indicating a deformation in the surface of a workpiece when the second output signal is received.

8 Claims, 1 Drawing Sheet

APPARATUS FOR DETECTING DEFORMATIONS IN PRESSED MEMBERS

CROSS REFERENCE TO RELATED APPLICATION

This application claims the priority of Federal Republic of Germany Application No. P 39 41 725.5, filed Dec. 18th, 1989, which is incorporated herein by reference.

BACKGROUND OF THE INVENTION

The present invention relates to a device for detecting deformations in pressed members made of sheet metal. The device has a light source which illuminates the pressed member and a receiver (detector) for receiving scattered components of light reflected by the pressed member. The light source and the receiver ar arranged at a fixed known distance from one another and move relative to the pressed member.

In the automobile industry lacquered sheet metal automobile body pieces are taken out of the production process when deformations in the form of minor bulges or dents are visible on the pieces. Such irregularities in the surface, that is, contour irregularities are not discernible by the naked eye before the lacquering process so that a removal of the body pieces from the production process at that time is not readily feasible. In order to select out reject body pieces even before the lacquering phase, the pieces are, for example, roughened manually by filing so that deformations become discernible to the eye as the surface at those locations has become particularly rough or has remained smooth. This procedure is very expensive and has the additional drawback that the entire surface is no longer smooth, but roughened.

A change in the surface is avoided if optical methods are employed. For example, a measuring process is known from the optical measuring art in which bulges or indentations in a surface are made visible by optical means in the form of moiré fringes. The surface to be examined in that process is illuminated through a first grid. Components of the light scattered and reflected by the surface are received by a camera through a second grid coordinated with the first grid. Rounded portions (bulges or depressions) in the surface are effectively rendered visible as contour lines, whose density is a measure of the slope of the rounded portion. In order to detect deformations, an actual profile has to be compared with a desired profile. This method is very expensive as two profiles have to be measured simultaneously and subsequent automatic detection is possible only by way of complicated image processing of the two moiré fringe patterns.

SUMMARY OF THE INVENTION

It is an object of the present invention to provide an improved optical device of the above-discussed type for providing information, without requiring a reference profile and without any changes to the surface of the pressed member, about whether the pressed member has any minor depressions or bulges in addition to its desired continuous curvature.

This object and others to be become apparent as the specification progresses, are accomplished by the invention, according to which, briefly stated, the device for detecting deformations in a contour of a workpiece includes a light source for illuminating the surface of the workpiece; a detector situated at a fixed predetermined distance from the light source and a displacing arrangement for effecting a relative movement between the workpiece and the light source. The detector comprises a photoreceiver for receiving reflected light from the workpiece and for generating a first output signal having a frequency dependent from the deformation of the workpiece. The photoreceiver is positionsensitive perpendicularly to a direction of the relative movement. A frequency analyzer is operatively connected to the receiver for receiving the first output signal from the photoreceiver and for generating a second output signal when the frequency of the first output signal exceeds a cutoff frequency. There is further provided a deformation indicator operatively connected to the frequency analyzer for receiving the second output signal therefrom and for indicating a deformation in the contour of a workpiece when the second output signal is received.

Thus, according to the invention, the light emanating from a light source is focused on the surface of a moving pressed member or a surface line of the stationary pressed member is illuminated and scanned by a laser beam emitted by a scanning laser beam generator along the direction of measurement. A photoreceiver which is position-sensitive perpendicularly to the direction of movement, emits an output signal which has a certain value if light impinges in the center of the photoreceiver. If the light strikes above or below the center, the output signal is stronger or weaker. If the pressed member is planar and has no deformations, the scattered light is always imaged on the center of the photoreceiver. A curvature (that is, a contour) creates an output signal whose time curve represents the curvature of the pressed member. If a deformation is present on the illuminated surface line in the form of a small dent, the time curve of the photoreceiver output signal will also exhibit a dip or a peak, that is, an alternating component. The output of the photoreceiver is connected to a frequency analysis arrangement. The output signal has the frequency "zero" if the pressed member is planar. If there is a curvature in the pressed member, low frequencies are recorded which represent the curvature of the pressed member. If a deformation in the form of a bulge or a dent is present, additional, significantly higher frequency components appear as the frequency of the output signal corresponds to the spatial frequency of the pressed member profile. The high-frequency components actuate a deformation indicator which signals that the pressed member must be removed from the production flow. The frequency spectrum also contains spectral components, at a great distance from the frequencies indicating the deformation, which provide information about the surface roughness of the pressed member and additionally permit a roughness depth indication.

The advantages of the apparatus according to the invention for detecting deformations are, in particular, that no absolute measuring of the profile (contour) of the pressed member is necessary given that only the deformation itself and not the shape of the profile of the pressed member produces an indication. Another advantage is that no image processing, but merely a frequency analysis of the output signal of the position sensitive photoreceiver is necessary. Further, no comparison between a desired profile and an actual profile is needed. It is a further advantage that the deformation detection is made in real time by means of simple standard electronic modules, wherein the light source and the photoreceiver are commercially available components. The process involves an incoherent optical measuring system which means that the measurement process is not sensitive against internal movements of the optical components in the sub-μm-range. According to another advantage, the surface of the measured member is neither touched nor damaged by the apparatus according to the present invention.

According to another feature of the invention, the cutoff frequency can be adapted to the curvature of the pressed member, and the less the degree of curvature of the pressed member, the lower the cutoff frequency. Thus, the curvature of the pressed member is taken into consideration so that not only planar pressed members but also pressed members having a curved shape can be examined. The curvature of the pressed member is always substantially less than the deformation (for example, the local curvature) caused by a dent so that the frequency spectrum of the output signal includes only frequencies below a cutoff frequency. The slope of the surface shape of the pressed member is changed substantially if there is a deformation: the surface no longer has a continuous gradient of the same sign but includes reversal points which lead to a change in the time curve of the output signal. If there is a deformation on the surface, the frequency spectrum of the output signal contains components of higher frequency. The cutoff frequency, above which a deformation indication is desired, lies at a considerable distance from the low-frequency components produced by the curvature of the pressed member being measured. However, the greater the curvature or the variation in pitch of the surface configuration of the pressed member, the higher the cutoff frequency must be placed. Advantageously, the cutoff frequency can be measured by the apparatus itself according to the invention by using an appropriate frequency indicator connected to the output of the frequency analyzer. Thus, the apparatus according to the invention can always be easily adapted to inspect the individual pressed member without prior theoretical considerations.

Instead of employing a computer circuit to perform Fourier transforms for the frequency analysis in frequently repeated examinations of pressed members having the same shape, an advantageous modification of the apparatus according to the invention includes a highpass filter in the frequency analyzer. Such a filter can be a simple highpass filter whose cutoff frequency is selected by taking into account the desired production curvature of the pressed member.

If, in addition to the existence of a deformation it is also of interest to know the depth thereof, such can be determined by a still further modification of the invention that includes an amplitude detector connected to the output of the frequency analyzer to obtain a measure of the depth of the deformation.

In order to examine the entire pressed member, it is necessary to have relative movement between the optical components and the pressed member being examined. According to a simple solution, the pressed member is left on its production belt and thus advanced thereby, and the laser transmitter and photoreceiver are mounted stationarily. Thus, the necessary relative movement is provided by the pressed member being moved by the production belt relative to the laser transmitter and photoreceiver.

It is, however, often difficult to move large pressed members. Accordingly, in a further preferred embodiment of the invention the pressed member and the photoreceiver are stationary and the laser beam is swept along the surface line to be examined. The lateral displacement of the scattered light occurring during that process is compensated for by an optical cylinder system connected to the input of the photoreceiver. A particular advantage of this embodiment is that the entire device is stationary and the relative displacement is achieved by the sweeping movement of the laser beam that can be performed significantly faster than a mechanical movement so that the test duration is substantially shortened.

A further preferred embodiment of the invention includes, for the simultaneous examination of areas of the pressed member, a laser transmitter serving as the light source configured to illuminate a line transversely to the direction of movement of the pressed member or to the sweeping movement of the illuminating laser beam. The receiver includes a plurality of position-sensitive photoreceivers permitting an area-wise examination of the pressed member. The required added expense is compensated for by the increase in the measuring speed. Furthermore, by connecting a hologram to the input of the laser transmitter, the pressed member can be illuminated in a series of juxtaposed dots along a line. The geometric association of the reflected components is made by way of the arrangement of the positionsensitive photoreceivers.

DETAILED DESCRIPTION OF THE PREFERRED EMBODIMENTS

Figure 1:
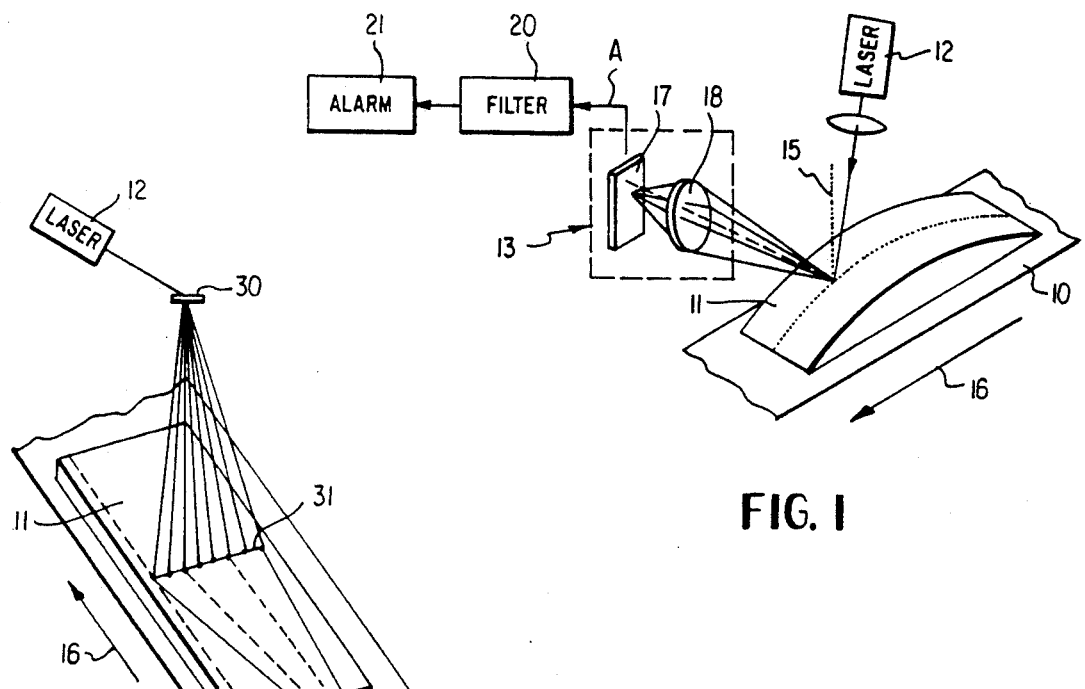
FIG. 1 is a schematic, symbolic, perspective view, with block diagram, of a preferred embodiment of the invention.

Turning to FIG. 1, the arrangement shown therein includes a curved pressed member 11 made of sheet metal disposed on a conveyor belt 10 which moves past underneath a laser transmitter 12 and a receiver (detector) 13. The laser transmitter 12 illuminates a point (dot-like area) of the pressed member 11, and scattered components of the laser light are received by the detector 13. The laser transmitter 12 and the detector 13 are stationary. An output signal A from the detector 13 is a function of the position of the light beam illuminating the detector. A light beam oscillating about its center generates an output signal in the form of an alternating voltage which may include a d.c. component as well. The detector 13 is arranged in such a manner relative to a direction 15 which is perpendicular to the direction of movement 16 that scattered light is focused on the center of a position-sensitive photoreceiver 17 by means of an optical system 18 if the scattered light originates from a point on the surface which lies at one-half the height of the curved pressed member 11.

Figure 2:
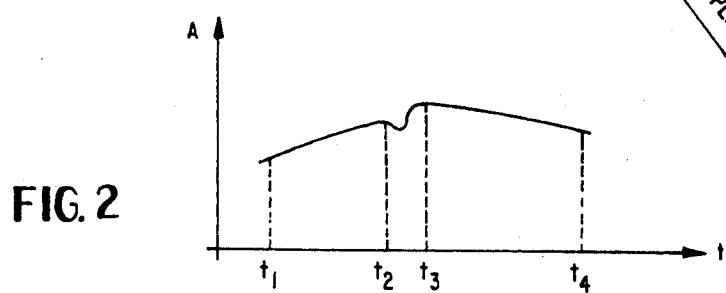
FIG. 2 is a diagram representing an output signal generated by the apparatus according to the invention.

Turning to FIG. 2, the graph shown therein represents the time curve for an output signal of the photoreceiver 17. The examination of the pressed member 11 begins at time $t_1$. The output signal has a constant slope until moment $t_2$ as the pressed member 11 has an inclination of constant slope in a first region. Between times $t_2$ and $t_3$, the laser beam from laser transmitter 12 illuminates a deformation which can be directly discerned by the shape of the output signal. Up to time $t_4$, the pressed member 11 has been examined along a line of its surface. As an alternative, it is feasible to pivot the laser beam and to thus scan the surface. The optical system 18 would then include additional cylindrical components which compensate for the displacement of the light emitted by the pivoting laser.

The frequency spectrum of the output signal A is examined in a frequency analyzer 20. In the time between $t_1$ and $t_2$, the output signal has low frequencies and the frequency "zero". High frequency components are noted between times $t_2$ and $t_3$. In the time from $t_3$ to $t_4$, the frequency spectrum again has low frequency components. The frequency analyzer 20 includes a highpass filter with a threshold circuit connected to its output as a deformation indicator 21 which may be an alarm or other type of output display. If there are high frequency components in the output signal A, an alarm is given and the pressed member 11 is taken out of the production process. In order to determine the depth of the deformation, the deformation indicator 21 includes an amplitude detector and indicator.

Figure 3:
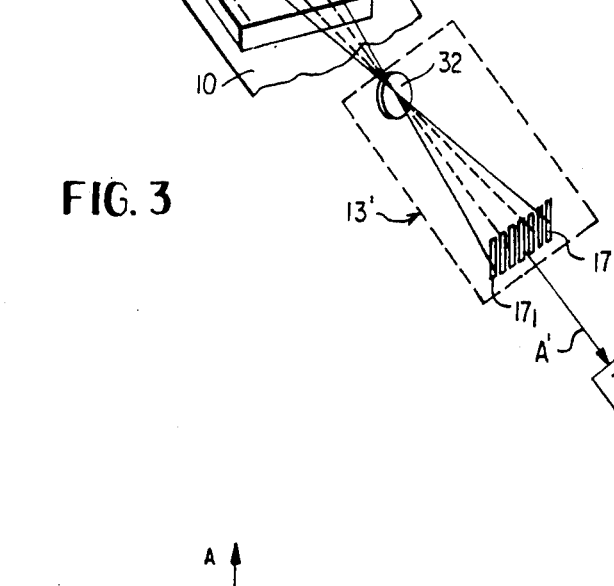
FIG. 3 is a schematic, symbolic perspective view of another preferred embodiment of the invention

Another preferred embodiment of the invention is shown in FIG. 3 in which the deformation detecting arrangement examines an area of the pressed member 11 on the conveyor belt 10. In this preferred embodiment a holographic optical element 30 is connected downstream of the laser transmitter 12 for simultaneously illuminating a series of point-like areas along a line 31 on the pressed member 11. The holographic optical element 30 is a medium on which the wave field of n number of light beams is stored. For reconstruction, the holographic optical element 30 is illuminated by the laser source 12 and furnishes a real image and a virtual image, with the real image illuminating the pressed member 11. The components of the n light beams scattered along line 31 are received with the intermediary of a lens 32 by a plurality of position-sensitive photoreceivers $17_1$ to $17_n$. The lens 32 and the photoreceivers $17_1$ to $17_n$ constitute a detector 13'.

The output signals A' of the photoreceivers $17_1$ to $17_n$ are evaluated, for example, in a computer for determining the Fourier transform and serving as a frequency analysis arrangement 20', and are then fed to a deformation indicator, for example, a display 21'. In this case, no highpass filter would be employed as, at the present state of the computer art, parallel signal processing of the output signals from the photoreceivers $17_1$ to $17_n$ can be performed quickly and cost effectively.

Such a position-sensitive photoreceiver 17 is an optical element. Its output signal depends on the receiving position of the light beam at the element. Such a photoreceiver 17 is e. g. manufactured by United Detector Technology (UDT), UK. The above mentioned holographic optical element 30 e. g. is generated by a laser beam devided into n subbeams by a beamsplitting arrangement. The n subbeams illuminate together with an interfering reference beam a light sensitive plate. After development this plate can be used as a holographic optical element 30. The optical system 18 is a lens.

It will be understood that the above description of the present invention is susceptible to various modifications, changes, and adaptations, and the same are intended to be comprehended within the meaning and range of equivalents of the appended claims.

What is claimed is:

1. In a device for detecting deformations in a contour of a workpiece, said device including a light source for illuminating the surface of the workpiece; a detector situated at a fixed predetermined distance from the light source and displacing means for effecting a relative movement between the workpiece and the light source; the improvement wherein said detector comprises a photoreceiver means for receiving scattered light from the workpiece and for generating a first output signal having a value dependent on a location where the scattered light is imaged on the photoreceiver means; said first output signal representing a contour of the workpiece; said photoreceiver means being position-sensitive perpendicularly to a direction of said relative movement; the improvement further comprising a frequency analyzer means operatively connected to said photoreceiver means for receiving the first output signal from said photoreceiver means and for generating a second output signal when the frequency of the first output signal exceeds a cutoff frequency corresponding to a spatial frequency of the contour; and a deformation indicator means operatively connected to said frequency analyzer means for receiving the second output signal from said frequency analyzer means and for indicating a deformation in the contour of a workpiece when the second output signal is received.

2. A device as defined in claim 1, further comprising means for varying the cutoff frequency in said frequency analyzer means.

3. A device as defined in claim 1, wherein said frequency analyzer means includes a highpass filter.

4. A device as defined in claim 1, wherein said deformation indicator means includes an amplitude detector.

5. A device as defined in claim 1, further wherein said displacing means comprises means for moving the workpiece relative to said light source and said detector; said light source and said detector being stationary.

6. A device as defined in claim 1, wherein said light source comprises a laser beam generating means for emitting a laser light beam and for sweeping the laser light beam along a surface line of the workpiece; further comprising an optical system, including cylindrical components arranged upstream of the photoreceiver means as viewed in the direction of propagation of said laser light beam.

7. A device as defined in claim 1, wherein said displacing means comprises means for moving the workpiece, further wherein said light source comprises a laser beam generating means for emitting a laser light beam illuminating a surface line on the workpiece in a direction perpendicular to a direction of motion of the workpiece and further wherein said photoreceiver means comprises a plurality of photoreceiver elements arranged transversely to the direction of motion of the workpiece and being position-sensitive in a direction perpendicular to the direction of motion of the workpiece and an orientation of the surface line of the workpiece.

8. A device as defined in claim 1, wherein said light source comprises a laser beam generating means for emitting a laser light beam and for sweeping the laser light beam along a surface line of the workpiece for illuminating the surface line in a direction perpendicular to the sweeping direction of the beam; wherein said displacing means comprises means for moving the workpiece; and further wherein said photoreceiver means comprises a plurality of photoreceiver elements arranged transversely to the direction of motion of the workpiece and being position-sensitive in a direction perpendicular to the direction of motion of the workpiece and an orientation of the surface line of the workpiece.

* * * * *